Aug. 29, 1933.  T. L. GREEN ET AL  1,924,549
BISCUIT CUTTING AND PANNING MACHINE
Filed June 5, 1930   12 Sheets-Sheet 4
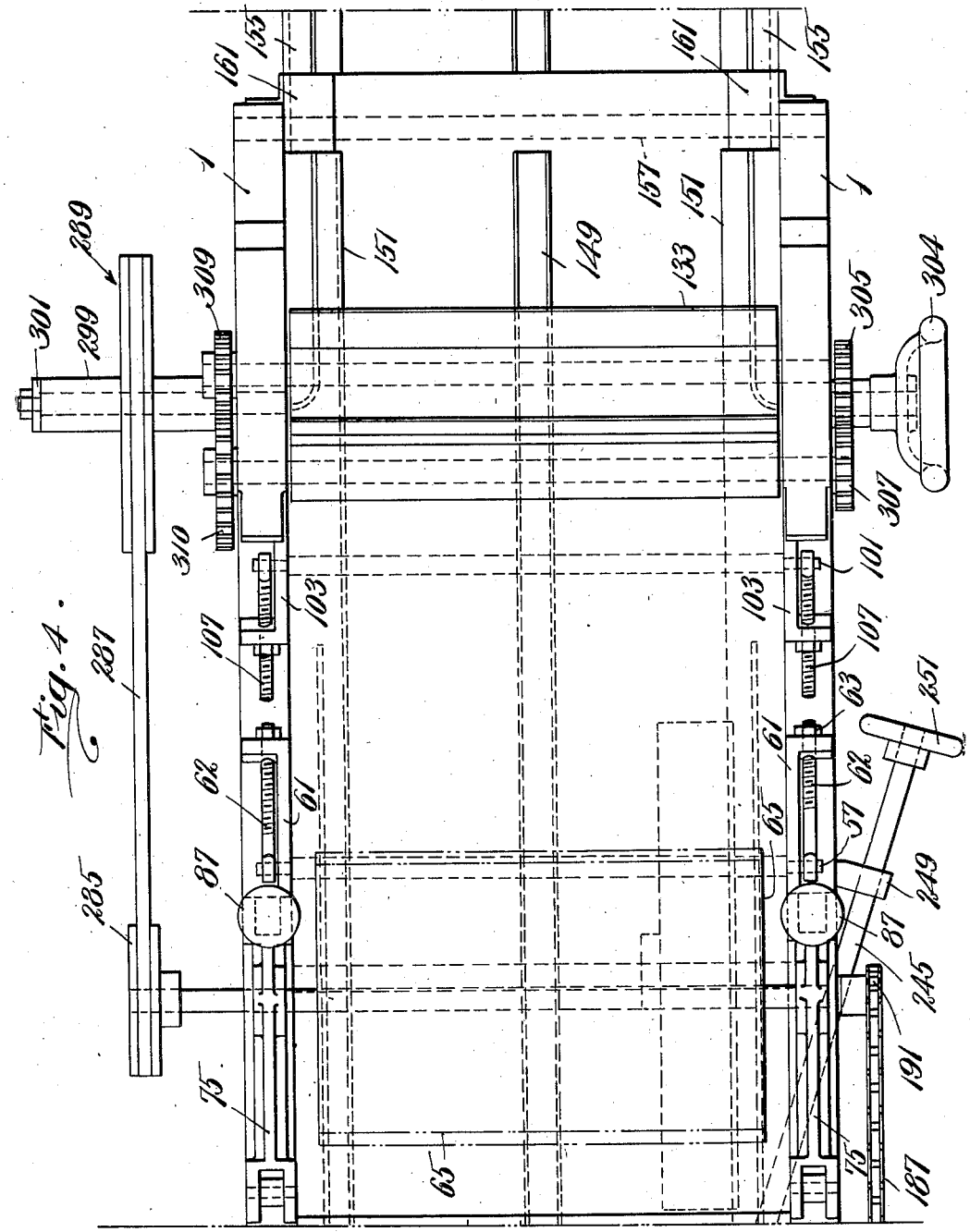
Inventors:
Thomas L. Green
Charles K. Williams
by Henry T. Williams  Atty.

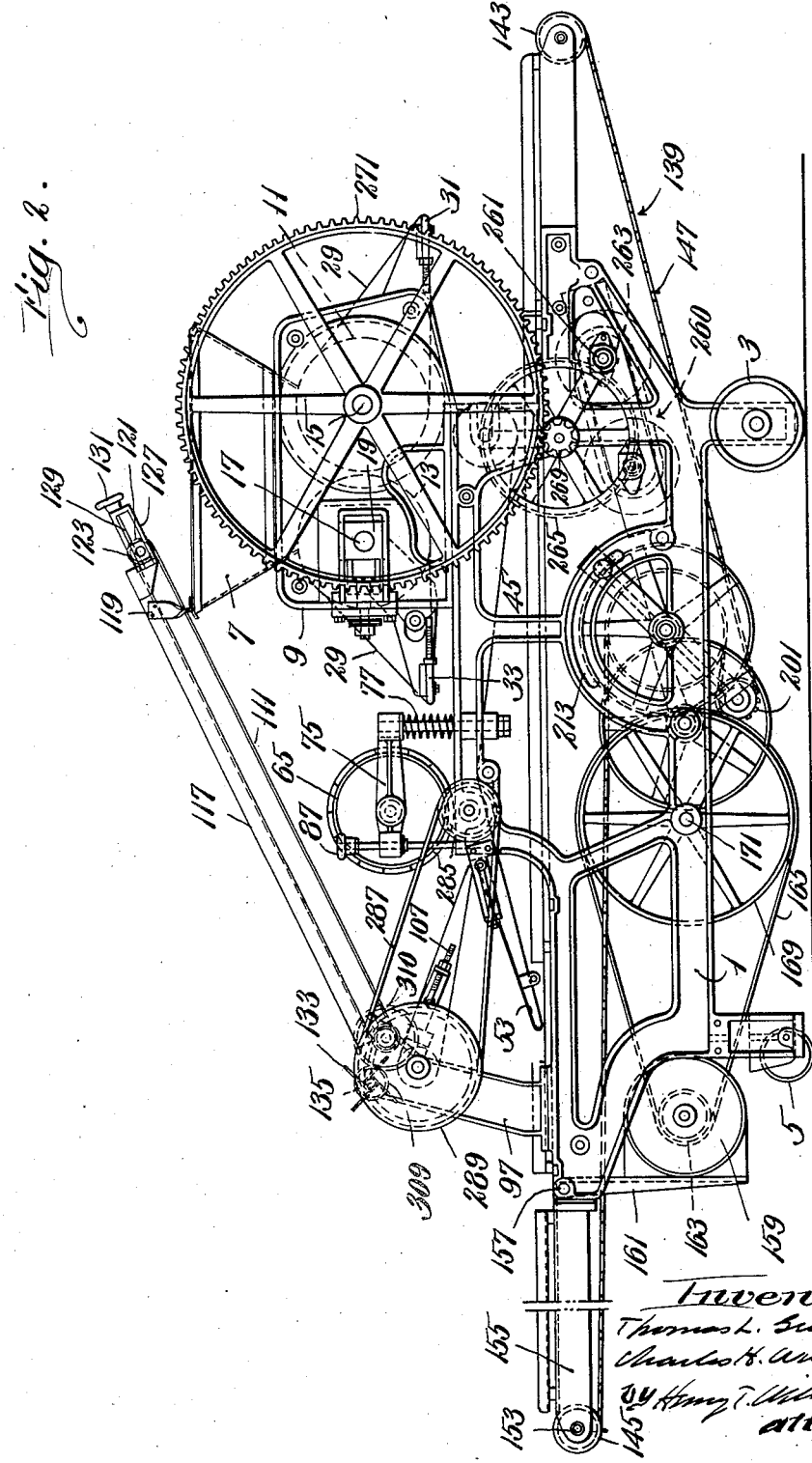

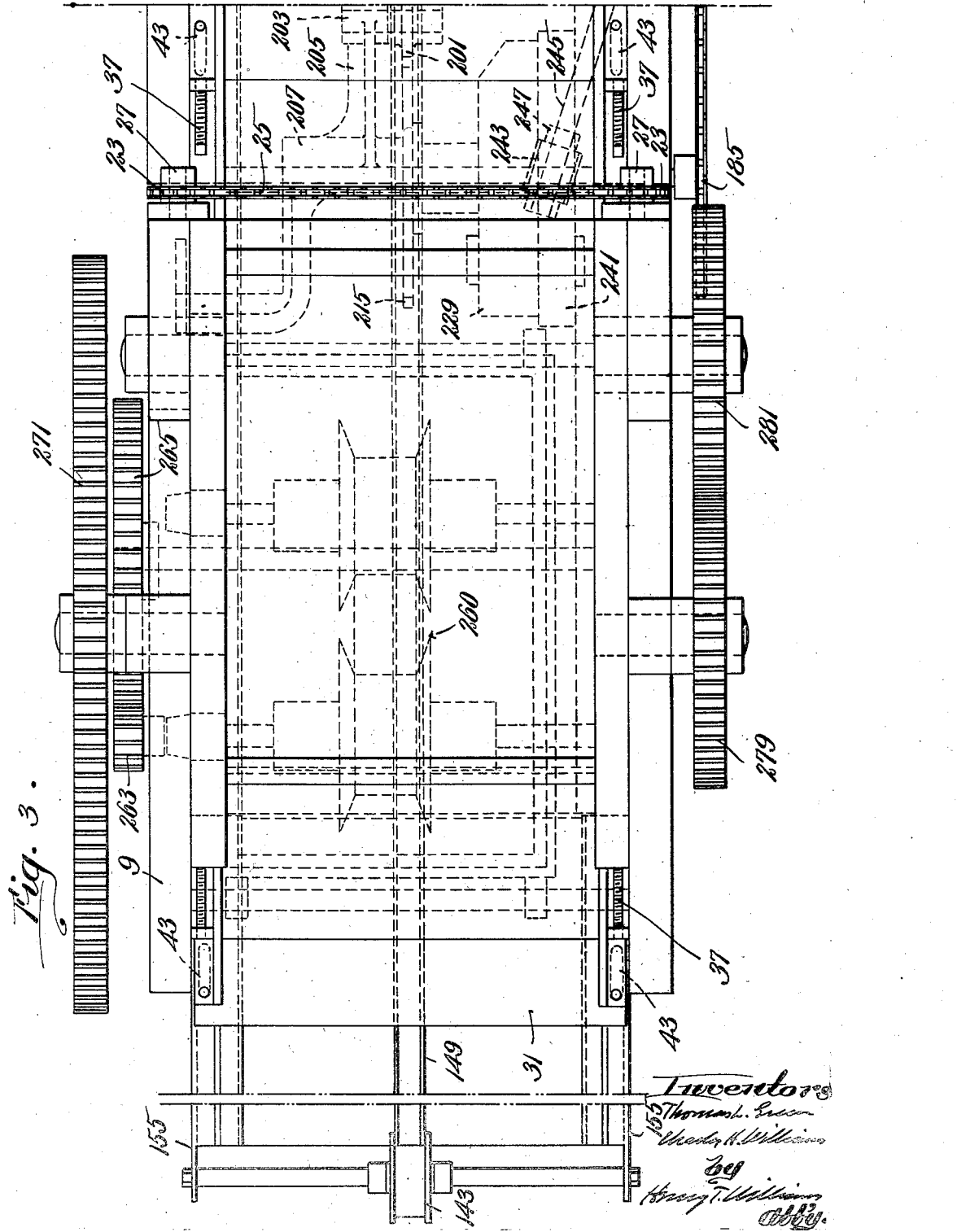

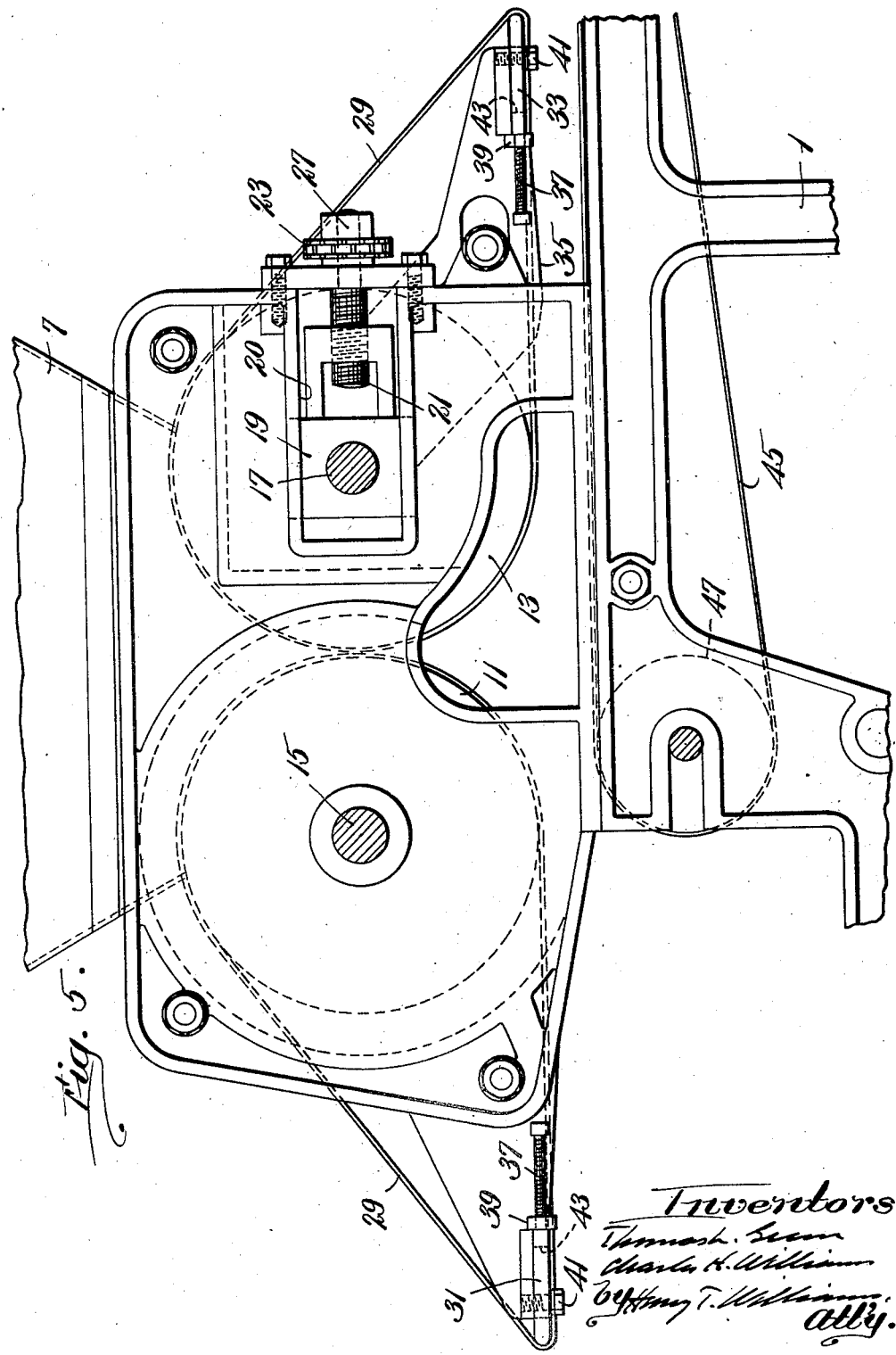

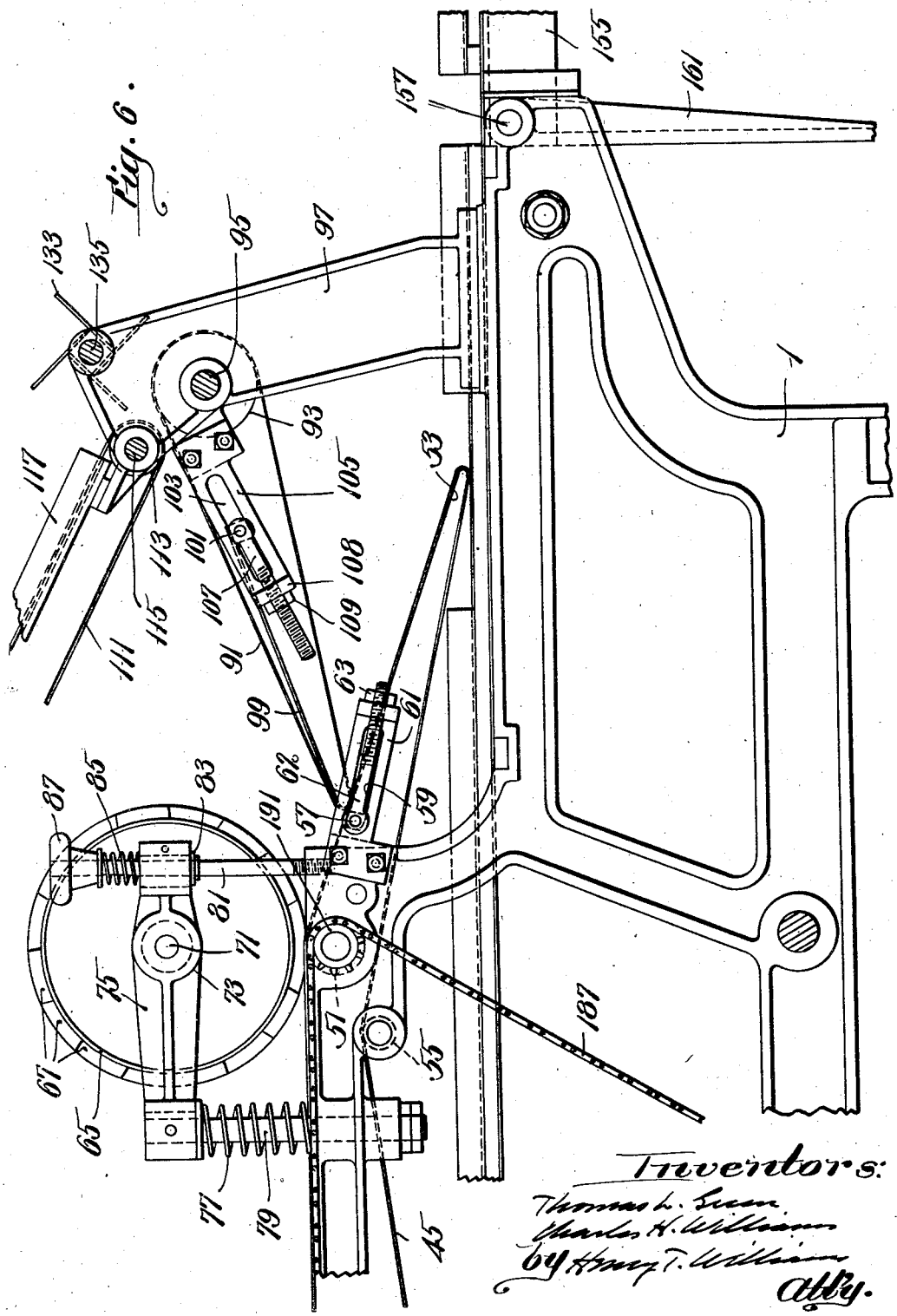

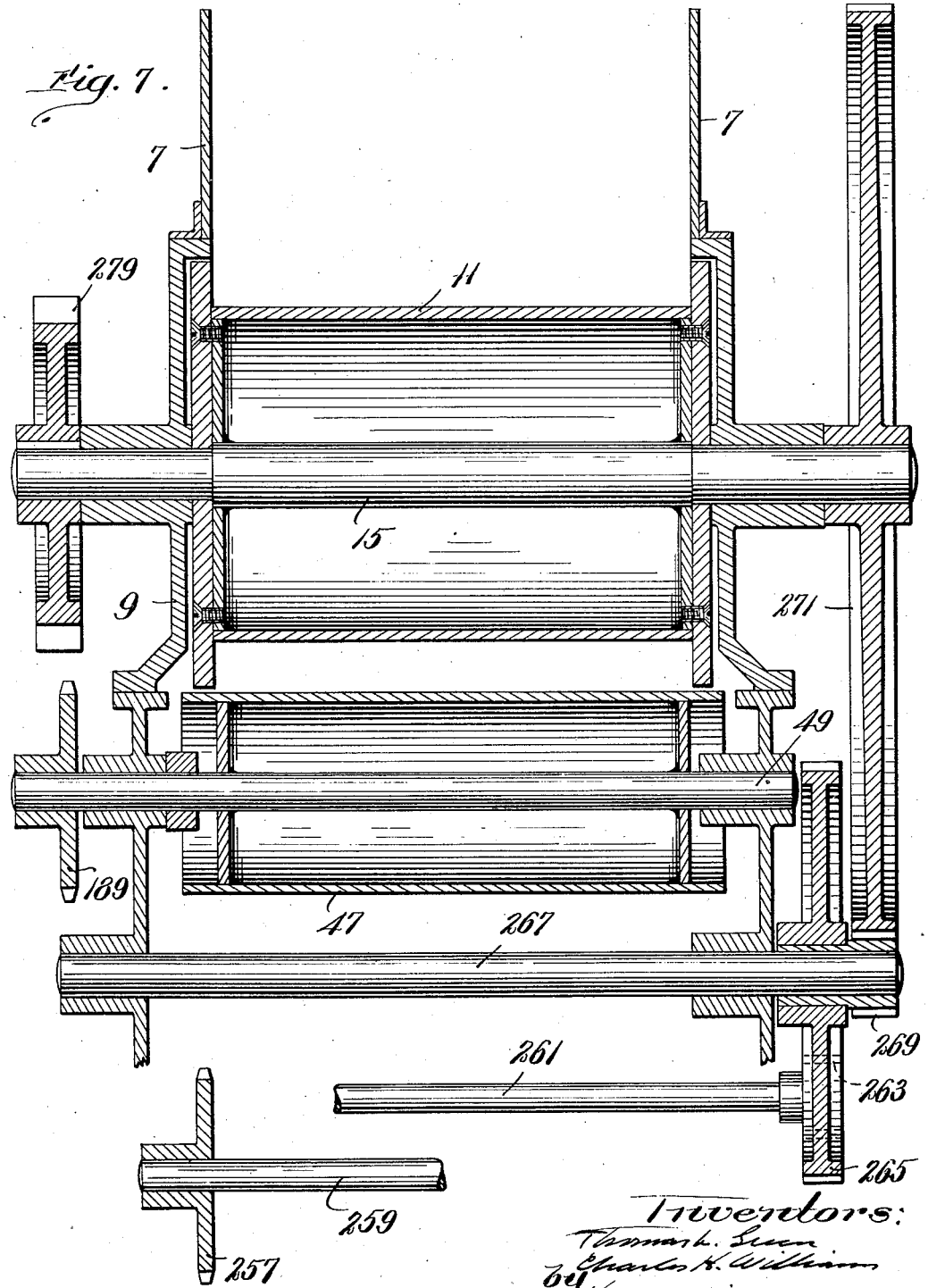

Aug. 29, 1933.  T. L. GREEN ET AL  1,924,549
BISCUIT CUTTING AND PANNING MACHINE
Filed June 5, 1930   12 Sheets-Sheet 8
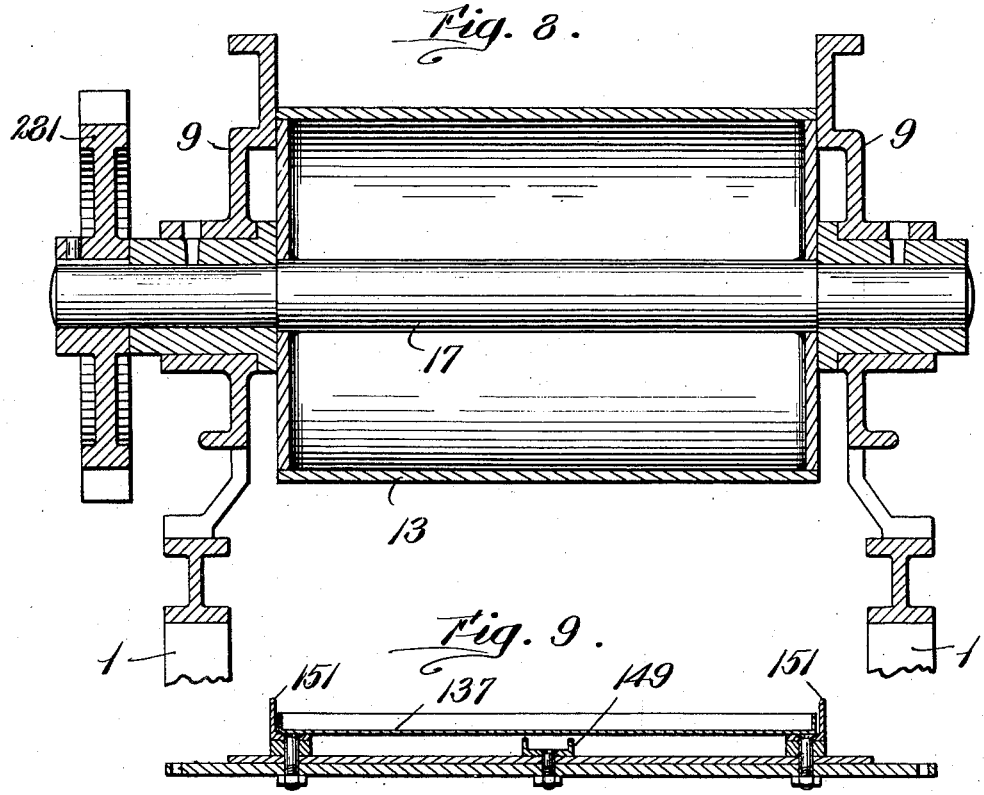
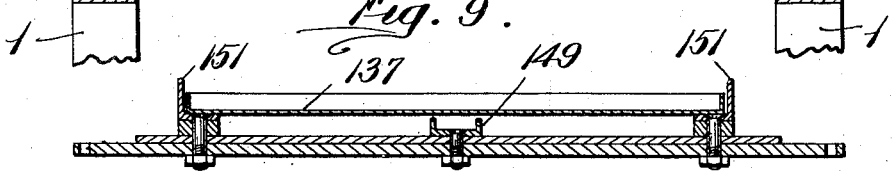
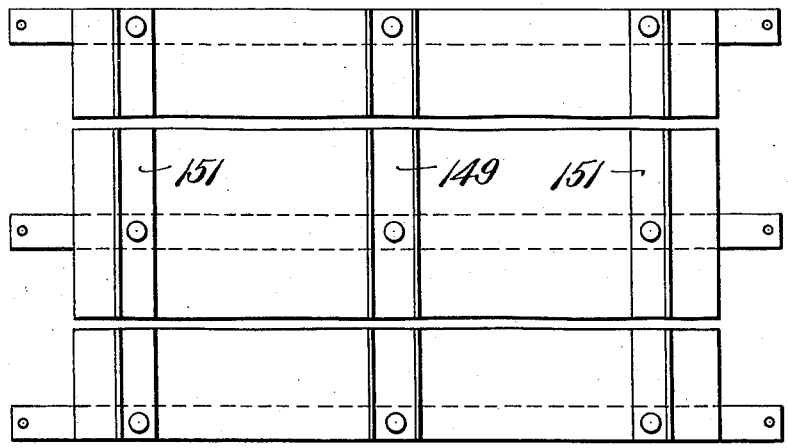

Aug. 29, 1933.   T. L. GREEN ET AL   1,924,549
BISCUIT CUTTING AND PANNING MACHINE
Filed June 5, 1930   12 Sheets-Sheet 9

Inventors:
Thomas L. Green
Charles H. Williams
by Henry T. Williams
Atty.

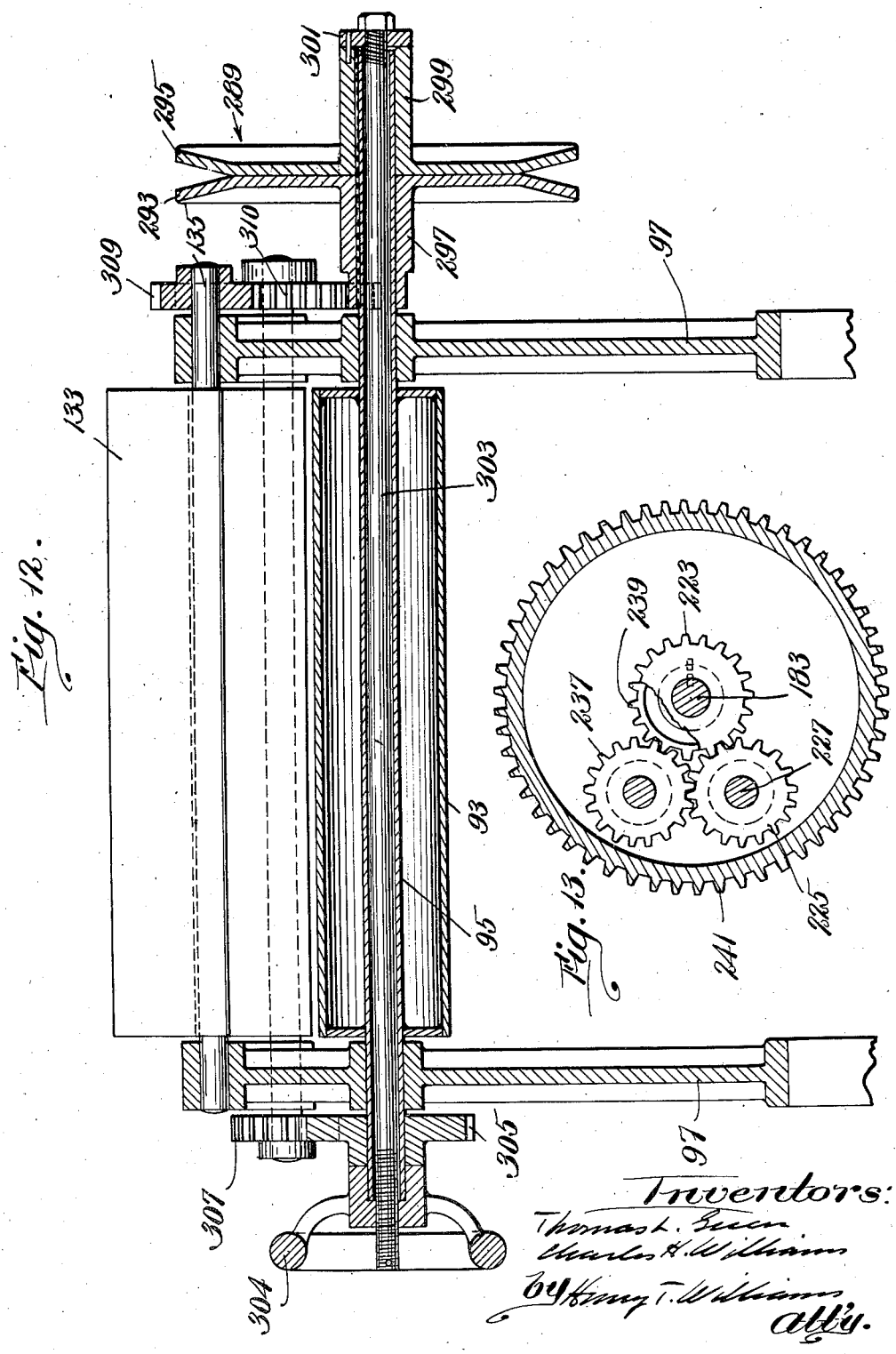

Aug. 29, 1933. T. L. GREEN ET AL 1,924,549
BISCUIT CUTTING AND PANNING MACHINE
Filed June 5, 1930 12 Sheets-Sheet 11
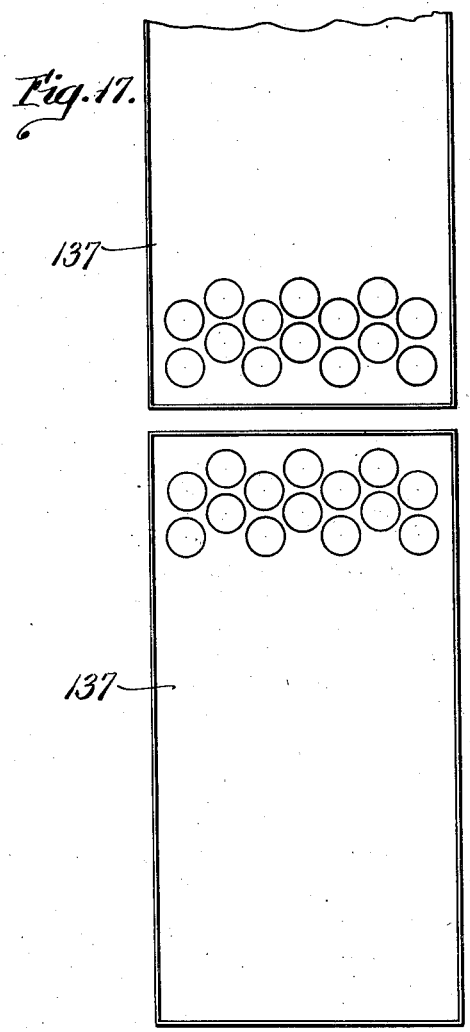
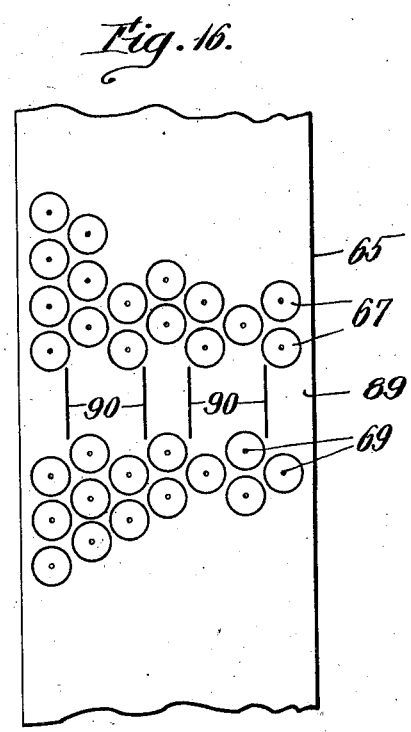
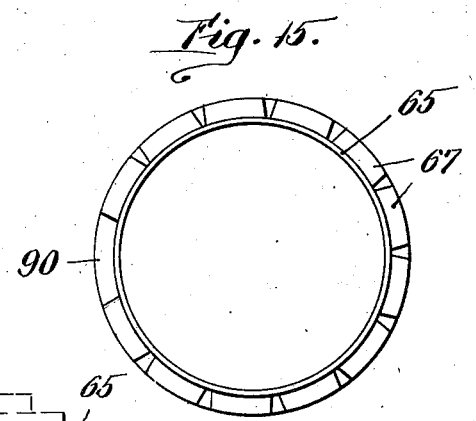
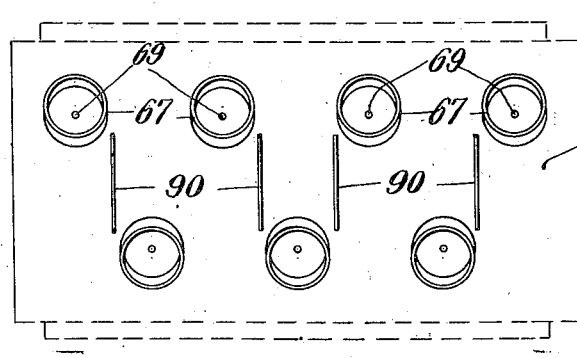

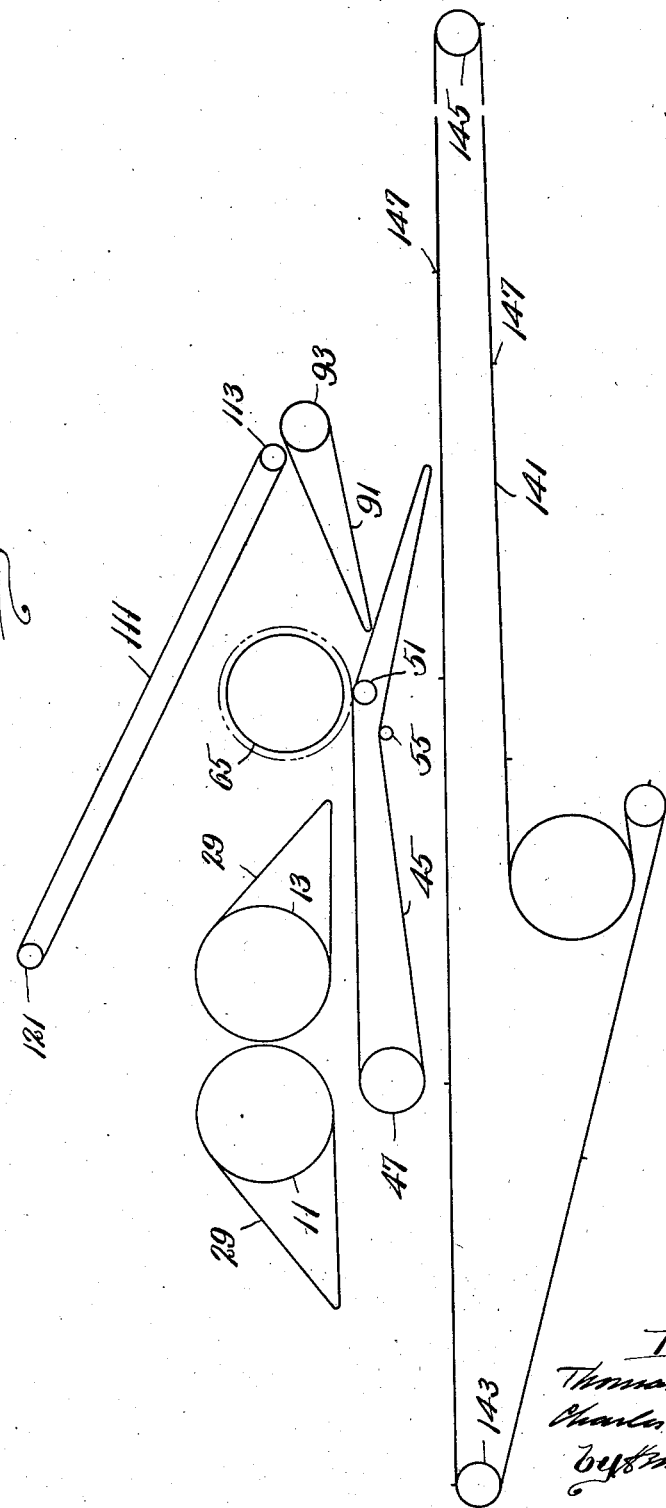

Patented Aug. 29, 1933

1,924,549

UNITED STATES PATENT OFFICE 1,924,549

BISCUIT CUTTING AND PANNING MACHINE

Thomas Luther Green and Charles Herbert Williams, Indianapolis, Ind.

Application June 5, 1930. Serial No. 459,301

14 Claims. (Cl. 107—6)

The invention to be hereinafter described relates to apparatus for dieing out articles from plastic material, and in the present instance is embodied in a biscuit cutting and panning machine.

An object of the invention is to provide a machine which is relatively simple and cheap to manufacture as compared to present biscuit cutting and panning machines, and to provide a machine which will be within the means of the small baker, and therefore susceptible of wide distribution.

The machine employs a cutter of the cylinder type rotated by the apron fed beneath the same. The cylinder has a space thereon without cutters, so that on each complete rotation of the cylinder, a batch of biscuits is died out from the sheet.

The biscuits are deposited in pans on a continuously fed pan carrier. The driving means for the pan carrier is such that adjustments may be made quickly and easily to insure deposit of batches of biscuits centrally on the pans.

The dough is fed into a hopper and between gage rolls which deliver the dough in sheet form to the main apron. Means is provided for varying the speed of the gage rolls with respect to the apron feed according to the character and thickness of dough sheet used. Aprons extend around the gage rolls and guide bars associated therewith to prevent the dough from adhering to the rolls. The dough sheet delivered from the rolls is carried by one of the aprons toward its guide bar and gravitates to the main apron.

The machine will be equipped with a complement of cutter cylinders, and provision is made for facilitating ready removal of a cutter cylinder from the machine and substitution of another therefor. The cutters on these cylinders may have various shapes and sizes in order that the machine may have a wide range of operation in dieing out biscuits differing in character.

With the aforesaid and other objects in view, the character of the invention may be best understood by reference to the following description of an embodiment thereof shown in the accompanying drawings, wherein:

Fig. 1 is a front elevation of the machine;
Fig. 2 is a rear elevation of the machine;
Figs. 3 and 4 taken together are a plan of a portion of the machine;
Fig. 5 on an enlarged scale is a view partly in elevation and partly in section showing the gage rolls, the aprons thereon, and the bars for guiding the aprons;

Fig. 6 on an enlarged scale is a view partly in elevation and partly in section showing the rotary cutter, the delivery run of the main apron, the scrap separator apron, a portion of the scrap return carrier, and the scrap return deflector;

Fig. 7 is a vertical section showing one of the gage rolls and the apron drive roll;

Fig. 8 is a vertical section through the other gage roll;

Fig. 9 is a vertical section showing the angle bar tracks for guiding the pans and the channel for guiding the pan drive sprocket chain;

Fig. 10 is a plan of the construction shown in Fig. 9;

Fig. 12 is a vertical section showing the scrap separator apron drive roll and the speed adjusting pulley therefor;

Fig. 13 is a vertical section taken on line 13—13 of Fig. 11;

Figure 1:
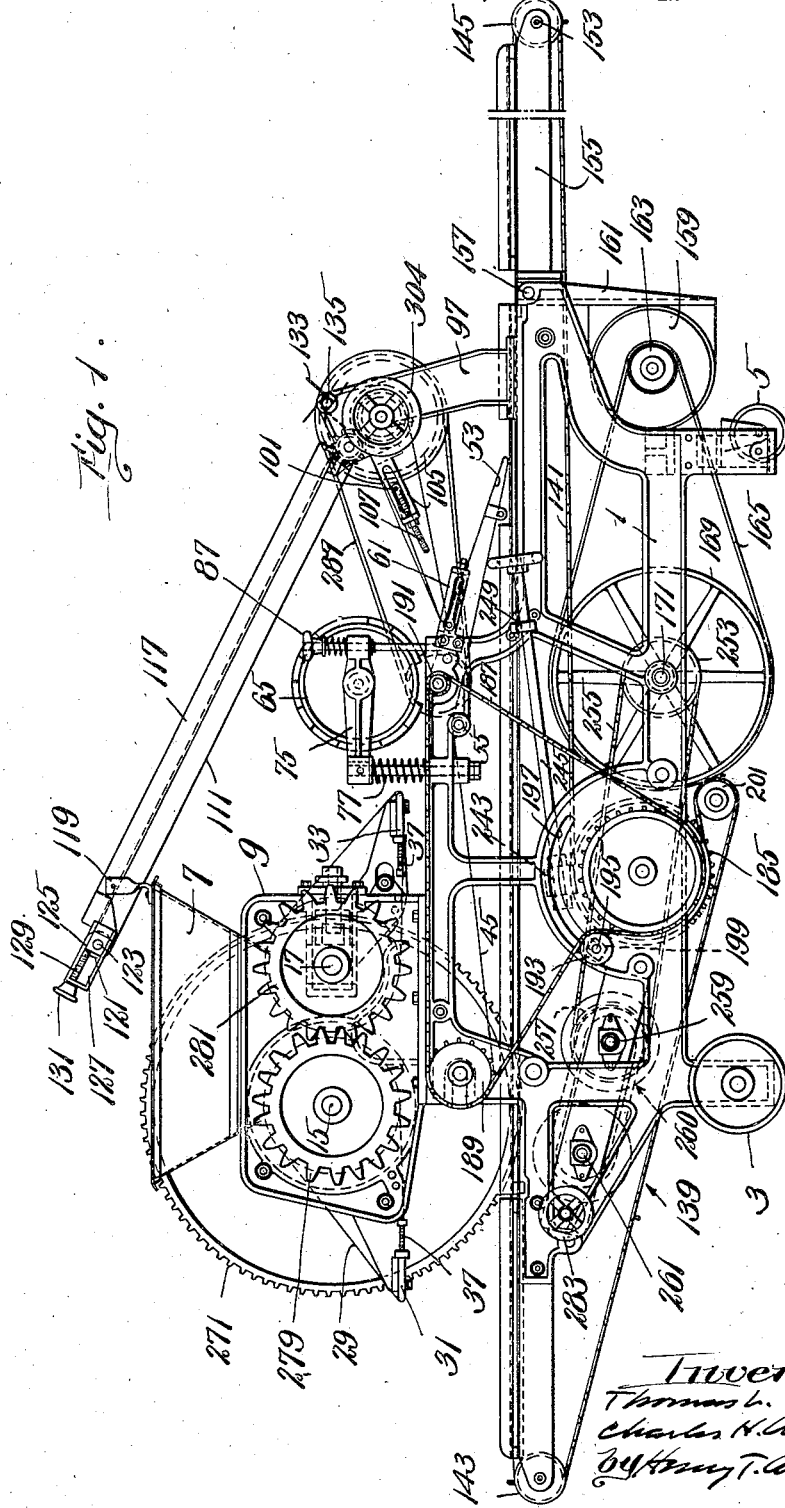

Fig. 14 is a plan of the cutter cylinder;
Fig. 15 is an end view of said cylinder;
Fig. 16 is a development of the cutter cylinder showing the disposition of the cutters thereon;

Fig. 17 is a plan showing spaced adjacent pans and biscuits deposited thereon; and Fig. 18 is a diagram showing the relation of the gage rolls, their aprons, the main dough sheet feed apron, the rotary cutter, the scrap separator apron, the scrap return carrier, and the pan carrier.

Referring to the drawings, the machine shown therein as one good form of the invention comprises a frame 1 mounted on a pair of wheels 3 adjacent one end of the frame, and a swivelled caster 5 adjacent the other end thereof. A hopper 7 for receiving the dough is mounted on a pair of side plates 9 on the machine frame, and delivers the dough to a pair of gage rolls 11 and 13 (Figs. 1, 2, 5 and 8) having shafts 15 and 17 journalled in bearings in the side plates. The shaft of the roll 13 is journalled in boxes 19 in guideways 20 in the plates. Connected to the boxes are screw shafts 21 having sprocket wheels 23 thereon connected by a sprocket chain 25 (Fig. 3). Both of these screw shafts have nut-shaped heads 27 for receiving a suitable tool for rotating the screw shafts to adjust the boxes in the guideways to vary the distance between the rolls as required.

Certain classes of dough have a sticky character, and tend to adhere to the gage rolls. To prevent this, the rolls may be provided with aprons 29 of felt or other suitable material passing around the rolls and around bars 31 and 33. The bar 31 is mounted on the side plates 9, and the bar 33 is mounted on plates 35 carried by the adjustable roll boxes, the construction being such that the adjustable roll and its bar may be adjusted together. The bars may be adjusted relatively to the rolls to vary the tension of the aprons, and to accomplish this, screws 37 are threaded in ears 39 projecting from the bar carrying plates, and to secure the bars in their positions of adjustment, screw bolts 41 are entered through elongated slots 43 in the bars and threaded into holes in flanges projecting from the plates. The construction is such that the dough sheet delivered from the gage rolls may be carried by one of the aprons toward its guide bar, and gravitate therefrom.

The main apron 45 (Figs. 5, 6 and 8) passes around a drive drum 47 on a shaft 49 journalled in bearings in the machine frame, and thence over a guide roll 51, around a panner blade 53 (Fig. 6), over a guide roll 55 and back to the drive drum. The panner blade is carried by a bar 57 having ends in elongated slots 59 in brackets 61 secured to the machine frame. To adjust the panner blade carrying bar, threaded eye-bolts 62 are connected to the brackets and ends of the bar and are secured by nuts 63.

The dough sheet is fed by the main apron to and beneath a cutter, in the present instance comprising a cylinder 65 having staggered rows of cup cutters 67 (Figs. 14 and 15) thereon, each provided with a vent hole 69 at the bottom thereof to enable discharge of the died out biscuits from the cutters. The cutter cylinder is mounted on a shaft 71 journalled in bearings 73 in arms 75 having ends yieldingly supported by coil springs 77 encircling studs 79 rising from the machine frame. The opposite ends of the arms are supported by rods 81 having their lower ends threaded into sockets in the machine frame. Collars 83 on the rods are beneath the arms, and coil springs 85 encircling the rods are confined between the upper sides of the arms and hand wheels 87 and yieldingly press the arms against the collars. The rods may be adjusted to properly position the cutter relatively to the apron. The cup cutters are distributed in staggered rows throughout the circumference of the cylinder with the exception of a gap or blank space 89 as shown in Fig. 14 and in the development of the cylinder in Fig. 16. The cutters are closely disposed so that the cutters of each row overlap the cutters of the next adjacent rows. The cylinder is rotated by feed of the apron beneath the same, and on each complete rotation thereof, a batch of biscuits will be died out from the dough sheet and of a length suitable for deposit in one of the pans.

Extending across the blank space 89 and slightly overlapping the cups of the rows adjacent thereto, are blades 90 secured to the cylinder. They serve not only to prevent the cylinder from moving toward and away from the apron, but also to engage the apron and positively rotate the cylinder while the blank space thereof is opposite to and passing the apron. Since the blades cut through the dough sheet along lines parallel to the direction of travel of the sheet, the cuts will not interfere with removal of the scrap by the scrap separator apron.

The machine may be equipped with a complement of cutter cylinders having cutters for dieing out biscuits of various shapes. When it is desired to remove a cutter cylinder from the machine, it is merely necessary to unscrew one of the rods from its socket in the frame, and this will allow the arm carrying one of the cylinder bearings to be swung on its stud away from the cylinder shaft. Then the cylinder may be moved axially to withdraw the shaft from the bearing on the other arm. Another cylinder may be introduced into the machine by reversing these operations.

The scrap surrounding the died out biscuits is separated from the latter a short distance beyond the cutter cylinder, and to accomplish this, a scrap separator apron 91 is provided extending around a drum 93 on a shaft 95 journalled in bearings in standards 97 mounted on the machine frame. This apron extends around a blade 99 carried by a bar 101 having ends in elongated slots 103 in brackets 105 secured to the standards. To adjust the blade relatively to the main apron panner blade, eye-bolts 107 are connected to ends of the blade carrying bar, pass through clearance holes in ears 108 on said brackets, and are tensioned by nuts 109.

To convey the scrap from the separator apron back to the hopper above the gage rolls, a scrap return carrier 111 (Figs. 1, 2, 6 and 18) is provided extending around a drum 113 on a shaft 115 journalled in bearings on the standards. Angle bars 117 are secured to and extend from the standards up to the hopper, and are secured to brackets 119 mounted on the hopper. The scrap return carrier extends around a drum 121 on a shaft 123 journalled in boxes 125 in guideways 127. Screws 129 having hand wheels 131 are provided to adjust the boxes.

To transfer the scrap from the scrap separator apron to the scrap return carrier, a rotary deflector 133 is mounted on a shaft 135 journalled in bearings in the standards adjacent the juncture of the scrap separator apron and the scrap return carrier.

The batches of biscuits died out by the rotary cutter are carried by the main apron to the panner blade, and are deposited in pans such as 137 (Fig. 17). These pans are conveyed by a pan carrier 139 extending the length of the machine and in the form of a sprocket chain 141 passing around a sprocket wheel 143 at the feeding-in end of the machine and around a sprocket wheel 145 at the delivery end of the machine. This chain has lugs 147 thereon at suitable intervals for engaging ends of the pans. The upper run of the chain passes over the channel 149 (Figs. 9 and 10), and the pans rest upon and are guided by angle bar tracks 151. The sprocket wheel at the delivery end of the machine is mounted on a shaft 153 journalled in bearings in extension arms 155 pivotally mounted on a shaft 157 mounted on the machine frame, the construction being such that the arms may be swung to an upright position to shorten the overall length of the machine and reduce the space occupied thereby when not in use.

Figure 11:
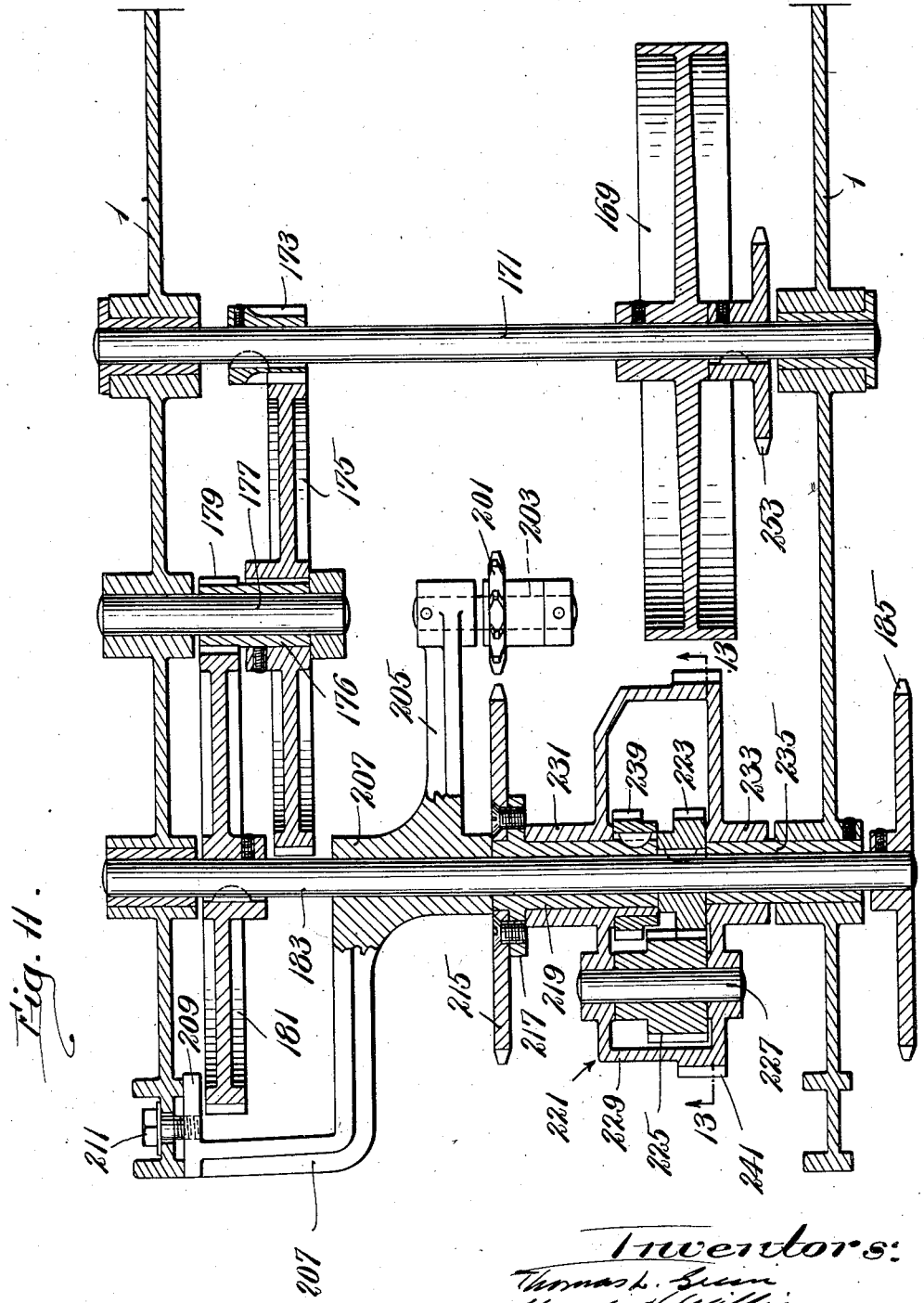
Fig. 11 is a horizontal section showing the differential gear mechanism and driving gears associated therewith.

Having described various instrumentalities of the machine, next will be described the driving means therefor. An electric motor 159 is secured to arms 161 depending from the shaft 157. The motor has a pulley 163 connected by a belt 165 to a pulley 169 (Fig. 11) on a shaft 171 journalled in bearings on the machine frame. Fast on this shaft is a pinion 173 meshing with a gear 175 fast on a sleeve 176 loose on a stub shaft 177 fixed on the machine frame. The sleeve has a pinion 179 meshing with a gear 181 on a shaft 183 journalled in bearings on the machine frame. Fast on the front end of said shaft is a sprocket wheel 185 connected by a sprocket chain 187 with a sprocket wheel 189 (Fig. 7) on the shaft of the drive drum 47 for the main apron. The sprocket chain passes over a sprocket wheel 191 on the shaft of the apron guide roll beneath the cutter cylinder, and thence back to the sprocket wheel 185. The chain passes over an idler sheave 193 on a stud 195 having a reduced end entered through an arcuate slot 197 in the front side of the machine frame, said stud being secured by a nut 199 thereon adapted to bear against frame portions at the sides of said slot. The stud may be adjusted in the slot to cause the idler sheave to take up slack in the sprocket chain as required.

The sprocket chain for feeding the pans passes over an idler wheel 201 (Fig. 11) on a stud shaft 203 mounted in an arm 205 on a hub 207 loose on the shaft 183. Projecting from the hub opposite from said arm is an elbow-shaped arm 207 having an ear 209 at the end thereof tapped to receive a screw bolt 211 entered through an arcuate slot 213 (Fig. 2) at the rear side of the machine frame. On release of this bolt the arms may be rocked to cause the idler wheel to take up slack in the sprocket chain. The arrangement is such that the sprocket chain is looped about this idler wheel, thereby enabling variation in the effective length of the sprocket chain according to the spacing of the pan feed lugs on the chain, it being understood that their spacing will vary according to variation in lengths of pans.

The pan feed sprocket chain is driven by a sprocket wheel 215 (Fig. 11) secured to a flange 217 on a sleeve shaft 219 driven by a differential gear mechanism 221 comprising a gear 223 keyed on the shaft 183 meshing with a wide-faced gear 225 (Fig. 13) on a stud shaft 227 mounted in a box 229 having a hub 231 on the sleeve shaft and a hub 233 on a bushing 235 on the shaft 183. Meshing with the gear 225 is a wide-faced gear 237 meshing with a gear 239 fast on the sleeve shaft. The construction is such that the shaft 183 through the differential gear mechanism described drives the pan carrier feed sprocket wheel.

It is desirable that the pan carrier feed sprocket chain shall be adjustable in order that the pan feed lugs on the sprocket chain shall synchronize arrival of pans beneath the panner blade with the delivery of batches of biscuits from the main apron, and insure proper deposit of the batches centrally on the pans, as indicated in Fig. 17, and without depositing biscuits on edges of pans or in the spaces between pans. To accomplish this, the differential gear box is rotatively adjustable either to advance or retard the pan carrier sprocket chain. The box has a skew worm gear 241 (Fig. 11) on the periphery thereof meshing with a skew worm 243 (Figs. 1 and 3) on a shaft 245 journalled in a bearing 247 and a bearing 249 mounted on the machine frame. This shaft extends diagonally from the worm out to the front of the machine frame, and is provided with a hand wheel 251 conveniently accessible. The construction is such that the hand wheel may be turned, and through the worm and worm gear rotatively adjust the gear box, and this adjustment may be made while the sprocket chain is travelling so that the operator may observe the relation of the pans to the batches of biscuits delivered by the main apron, and readily and quickly secure the desired relation between the pan carrier and the main apron. The gear box is normally stationary, and the worm and worm gear serve to secure the same in the positions to which it is adjusted.

To drive the gage rolls, a sprocket wheel 253 (Figs. 1 and 11) is provided on the shaft 171 referred to, and is connected by a sprocket chain 255 with a sprocket wheel 257 fast on the shaft 259 of a variable speed transmission mechanism 260 (Figs. 1 and 3) of well known construction. The other shaft 261 of said mechanism has a pinion 263 thereon meshing with a gear 265 on a shaft 267 carrying a pinion 269 (Fig. 2) at the rear of the machine meshing with a large gear 271 on the driving gage roll shaft 15. A gear 279 fast on this shaft at the front of the machine meshes with a gear 281 on the driven gage roll shaft 17. The variable speed transmission mechanism has a hand wheel 283 (Fig. 1) accessible at the front of the machine to vary the speed of the gage rolls as required.

Some doughs tend to stretch and others tend to contract in passing from the gage rolls to the main apron. If they stretch the speed of the gage rolls should be retarded relatively to the speed of the apron, whereas, if doughs tend to contract, the speed of the gage rolls should be greater than the speed of the apron. By the driving means described, the speed of the gage rolls may be varied with a desirable nicety of adjustment to obtain a dough sheet of the desired thickness and to secure proper delivery of the same to the apron.

To drive the scrap separator apron, a sheave 285 (Figs. 2 and 4) is provided on the shaft of the main apron guide roll 51, and said sheave is connected by a belt 287 with a sheave 289 (Fig. 12) on the sleeve shaft 95 carrying the scrap separator apron drum. The sheave 289 comprises a pair of dished disks 293 and 295, the former having a hub fast on the sleeve shaft, and the latter disk having a hub 299 splined and slidable on said shaft. A washer 301 is threaded on a shaft 303 extending through the sleeve shaft, said washer being confined between the hub 299 and a nut on the shaft 303. At the front of the machine is a hand wheel 304 having a hub threaded on the shaft 303. By turning this hand wheel the shaft is moved longitudinally in the sleeve shaft to adjust the disk 295 relatively to the disk 293, thereby to vary the effective driving radius of the sheave, and thus vary the speed of feed of the scrap separator apron, as required.

To drive the scrap return carrier, a gear 305 (Figs. 1 and 12) is provided on the sleeve shaft 95 and meshes with a gear 307 on the shaft 115 carrying the lower drum of the scrap return carrier. To drive the deflector, a gear 309 is provided on the deflector shaft, and meshes with a gear 310 on the shaft 115.

In operation, dough is fed from the hopper by the gage rolls in sheet form and delivered to the main apron which conducts it beneath the rotary cutter. On each complete rotation thereof, a batch of biscuits is died out from the dough sheet. The dough surrounding the died out biscuits is separated from the latter by the scrap separator apron, and conveyed to the return scrap carrier which delivers the scrap into the hopper where it mixes with the fresh dough. The pan carrier is continuously fed, and the batches of biscuits are conveyed by the main apron down over the panner blade and deposited on the pans. The blank space between the batches substantially equals the space between adjacent pans plus the marginal spaces without biscuits at the ends of the pans. The length of the periphery of the cutter should be equal to the distance between the leading edge of a pan and the leading edge of the next adjacent pan. Thus deposit of biscuits on edges of pans and between adjacent pans is avoided. Pans of various lengths may be fed through the machine, and the lugs on the pan carrier feed chain are adjusted in accordance with the lengths of the pans. When such a change is made, the differential gear mechanism may be adjusted, and also the idler wheel 201 may be adjusted to vary the effective length of the pan feed chain as required.

By this invention there is provided an efficient machine for dieing out biscuits in batches and depositing the same in pans. This machine is relatively simple and cheap in construction as compared to machines heretofore employed for cutting and panning biscuits, the aim being to provide a machine which will be available to and within the means of the smaller baker.

It will be understood that the invention is not limited to the specific embodiment shown, and that various deviations may be made therefrom without departing from the spirit and scope of the appended claims.

What is claimed is:

1. A machine of the character described comprising, in combination, an apron for feeding a sheet of plastic material, a cutter for dieing out batches of articles from the sheet, a pan carrier adapted to carry pans for receiving the articles from the sheet, a shaft, means driven by said shaft for feeding the apron, a differential gear mechanism including a normally stationary box on said shaft, gears in said box driven by the shaft, means driven by the gears for feeding the pan carrier, and means rotatively to adjust the box to advance or retract the carrier to assure proper deposit of the batches on the pans.

2. A machine of the character described comprising, in combination, a cylinder having cutters distributed throughout the periphery thereof excepting a blank space, an apron for conveying a plastic sheet beneath the cylinder, the latter being rotated by engagement of the cutters with the apron, a carrier for conducting pans past the delivery end of the apron that the pans may receive batches of biscuits died out by the cutter, said carrier having lugs thereon spaced according to the lengths of the pans, and driving means for the carrier including means for advancing or retracting the carrier to assure proper deposit of the batches on the pans.

3. A machine of the character described comprising, in combination, an apron for feeding a dough sheet, and a rotary cylinder having cutters distributed thereon and leaving a blank space without cutters, that the cutters may die out spaced batches of biscuits from the sheet on rotation of the cylinder, and means at the space on the cylinder for engaging the apron to prevent the cylinder from moving toward the apron when the space is opposite the apron, the cylinder being rotated by engagement of the cutters and said means with the apron and feed of the apron beneath the cylinder.

4. A machine of the character described comprising, in combination, an apron for feeding a dough sheet, and a rotary cylinder having cutters distributed thereon and leaving a blank space without cutters, that the cutters may die out spaced batches of biscuits from the sheet, and blades at the blank space on the cylinder for engaging the apron to prevent the cylinder from moving toward the apron when the blank space is opposite the apron, the cylinder being rotated by engagement of the cutters and blades with the apron and feed of the apron beneath the cylinder.

5. A machine of the character described comprising, in combination, an apron for feeding a dough sheet, and a rotary cylinder having staggered rows of cutters thereon, the cutters of each row overlapping the cutters of the next adjacent rows, said cylinder having a blank space without cutters, and means for preventing the cylinder from moving toward the apron when the space is opposite the apron, the cylinder being rotated by engagement of the cutters and said means with the apron and feed of the apron beneath the cylinder.

6. A machine of the character described comprising, in combination, an apron for feeding a dough sheet, and a cylinder having cutters thereon arranged to leave a blank space without cutters, that the cutters may die out spaced batches of biscuits from the sheet, said cylinder receiving rotary motion by engagement of the cutters with the apron and feed of the latter beneath the cylinder.

7. A machine of the character described comprising, in combination, an apron for feeding a dough sheet, and a cylinder having cutters thereon arranged to leave a blank space, said cutters being adapted to die out from the sheet batches of biscuits spaced to prevent deposit of biscuits on edges of batch receiving pans.

8. A machine of the character described comprising, in combination, an apron for feeding a dough sheet, a rotary cylinder having cutters thereon for dieing out batches of biscuits from the sheet, and a carrier for feeding batch receiving pans successively beneath the delivery end of the apron, said cutters being arranged on the cylinder to leave spaces between the batches to prevent deposit of biscuits on edges of the pans.

9. A machine of the character described comprising, in combination, an apron for feeding a dough sheet, a rotary cutter comprising a cylinder having cutters thereon arranged for dieing out spaced batches of biscuits from the sheet on rotation of the cylinder, and a carrier for feeding batch receiving pans successively beneath the delivery end of the apron, the length of the periphery of the cutter being equal to the distance between the leading edge of a pan and the leading edge of the next adjacent pan, said cutters being arranged on the cylinder to leave spaces between the batches to prevent deposit of biscuits on edges of the pans.

10. The method of cutting biscuits from a dough sheet on a moving apron for delivery by the apron to a succession of moving biscuit receiving pans, which is characterized by dieing out from the dough sheet on the moving apron spaced batches of biscuits, each batch being of a size to fit within a receiving pan, and the spaces between batches being such that no biscuits are deposited on an edge of a receiving pan.

11. The method of cutting biscuits from a dough sheet on a moving apron for delivery by the apron to a succession of moving discuit receiving pans, which is characterized by dieing out from the dough sheet on the moving apron predetermined batches of biscuits spaced a predetermined distance apart, whereby each batch is deposited in a receiving pan without depositing any of the biscuits on an edge thereof.

12. The method of cutting biscuits from a dough sheet on a feeding apron for delivery thereby to biscuit receiving pans, which is characterized by dieing out from the dough sheet on the apron predetermined batches of biscuits spaced a predetermined distance apart, whereby each batch may be deposited in a receiving pan without depositing any of the biscuits on an edge thereof.

13. The method of positioning biscuits on an apron for delivery to receiving pans, which is characterized by dieing out of a dough sheet on the apron predetermined batches of biscuits with predetermined spaces between batches, removing the dough between the biscuits and between the batches, and depositing the batches in a succession of receiving pans, whereby each batch is deposited in a receiving pan without depositing any biscuits on edges of the pan.

14. A machine of the character described, comprising, in combination, an apron for feeding a dough sheet, and biscuit-forming means having successively acting forming devices thereon arranged with a gap between certain of the devices to die out from the dough sheet on the apron batches of biscuits spaced to prevent deposit of biscuits on edges of batch-receiving pans.

THOMAS LUTHER GREEN.
CHARLES HERBERT WILLIAMS.